No. 709,538. Patented Sept. 23, 1902.
C. GARBER.
LATCH.
(Application filed May 19, 1902.)
(No Model.)
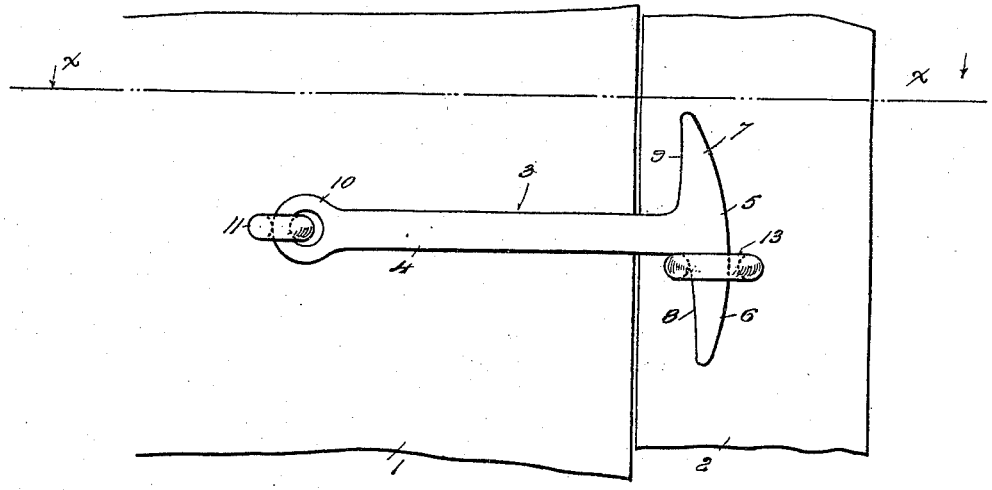
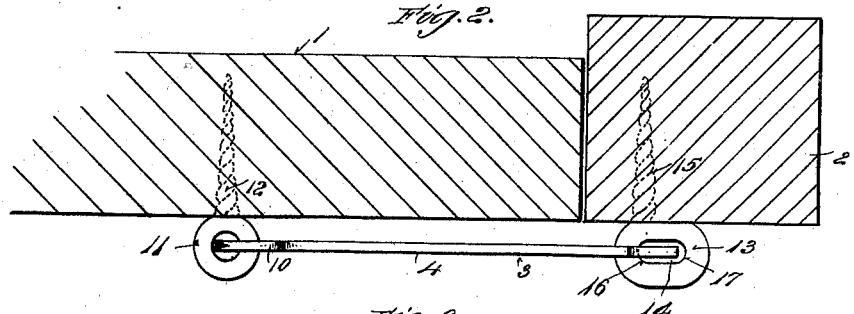
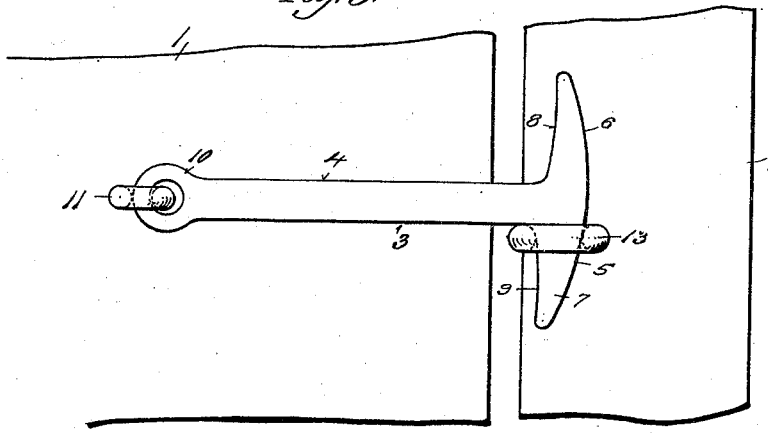
WITNESSES:
J. C. Dawley
Will O'Laughlin
INVENTOR
Christian Garber
BY
ATTORNEY.

UNITED STATES PATENT OFFICE.

CHRISTIAN GARBER, OF FINDLAY, OHIO.

LATCH.

SPECIFICATION forming part of Letters Patent No. 709,538, dated September 23, 1902.

Application filed May 19, 1902. Serial No. 107,935. (No model.)

*To all whom it may concern:*

Be it known that I, CHRISTIAN GARBER, a citizen of the United States, residing at Findlay, in the county of Hancock and State of Ohio, have invented certain new and useful Improvements in Latches, of which the following is a specification, reference being had therein to the accompanying drawings.

This invention relates to latches, and more particularly to latches of the hook-and-eye type, and has for its object to provide a construction whereby changes in the relative position of the parts to which the members of the fastening are applied—as, for instance, the gate and gate-post—may be readily compensated for, so as to make the latch effective without removing either of the members.

To this end my invention consists in certain novel features, which I will now proceed to describe, and will then particularly point out in the claims.

In the accompanying drawings, Figure 1 is a plan view of a construction embodying my invention, the parts being shown in the position which they occupy when the latch is originally applied or when the gate and gate-post are in their normal position. Fig. 2 is a plan section taken on the line $x\ x$ of Fig. 1 and looking in the direction of the arrows; and Fig. 3 is a view similar to Fig. 1, showing the parts of the latch adjusted to properly engage after the gate and gate-post have become separated or have assumed an abnormal position.

In the said drawings, 1 indicates a portion of a gate, door, or other similar movable part, and 2 a gate-post, door-post, or the like.

3 indicates the latch proper or hook member, which comprises a shank 4 and head 5, the head having oppositely-directed hooks 6 and 7, the engaging surfaces or edges 8 and 9 of which are at different distances from the pivotal connection at the other end of the latch. This pivotal connection is preferably effected by means of an eye 10 on the end of the shank 4, which engages a similar eye 11, provided with a threaded shank 12, adapted to screw into the wood and being, in effect, what is known as a screw-eye, although an eyebolt or similar device may be employed.

The keeper, which is indicated as a whole by the reference-numeral 13, comprises an eye 14 and a threaded shank 15, the eye being elongated and the shank being eccentric, so that one of the engaging edges of the eye—as, for instance, the edge 16—is nearer the central line of the shank than the other engaging edge 17.

When the members of the latch are originally applied, as shown in Fig. 1, the hook 3 is so turned that that head thereof—to wit, the head 6—which has its engaging edge 8 farthest from the pivot of the hook is directed downward, while the eye 13 is so turned that its engaging edge 16 nearest the axis of the shank is nearest the hook. In case the parts 1 and 2 separate through sagging or otherwise, thus increasing the distance between the hook and eye, the parts may be caused to properly engage by either giving the eye 11 and the hook 3 a half-turn and reversing the hook, as indicated in Fig. 3, or by giving the eye 13 a half-turn, as also indicated in Fig. 3, and in case the distance becomes further increased both members may be turned into the position shown in Fig. 3, thereby still permitting a proper engagement of the members of the latch. Ordinarily it has been necessary to remove the members from the woodwork and reapply them thereto in order to adjust them to the position of the parts to which they are applied, which is obviously disadvantageous and which is rendered unnecessary by my improved construction.

I do not wish to be understood as limiting myself to the precise details of construction hereinbefore described, and shown in the accompanying drawings, as it is obvious that these details may be modified without departing from the principle of my invention.

Having thus fully described my invention, what I claim as new, and desire to secure by Letters Patent, is—

1. In a latch of the character described, the combination, with a keeper-eye constituting one member of the latch, of a hook constituting the other member of the latch and comprising a shank, a connecting device rotatably mounted in the part to which the hook is applied, the shank of the hook being pivotally connected at one end to said connecting device, and being provided at its other end with oppositely-directed fixed heads or engaging members, the engaging edges of which are at different distances from the pivotal connection of the shank, said hook being reversible, substantially as described.

2. In a latch of the character described, the combination, with a pivoted hook constituting one member, of a keeper constituting the other member and consisting of an eye provided with an eccentric shank rotatably mounted in the part to which it is applied, the engaging edges of the eye being at different distances from the axis of the shank, substantially as described.

3. In a latch of the character described, the combination, with a keeper-eye constituting one member of the latch, said eye having an eccentric shank rotatably mounted in the member to which it is applied, and the engaging edges of the eye being at different distances from the axis of the shank, of a hook constituting the other member of the latch and comprising a shank, a connecting device rotatably mounted in the part to which the hook is applied, the shank of the hook being pivotally connected at one end to said connecting device, and being provided at its other end with oppositely-directed fixed heads or engaging members, the engaging edges of which are at different distances from the pivotal connection of the shank, said hook being reversible, substantially as described.

4. The combination, with a gate or door and gate-post or door-post, of a latch comprising a screw-eye mounted in the door, a hook having a shank provided at one end with an eye to engage the screw-eye and having at its other end oppositely-directed fixed heads with engaging edges at different distances from the screw-eye, and a keeper consisting of an elongated eye having an eccentric threaded shank to engage the post, substantially as described.

In testimony whereof I affix my signature in presence of two witnesses.

CHRISTIAN GARBER.

Witnesses:
L. E. GARBER,
W. FORSYTH.